Jan. 4, 1966  D. K. SMITH  3,227,213
WELL CEMENTING METHOD
Filed April 16, 1965  3 Sheets-Sheet 1

INVENTOR.
Dwight K. Smith
BY
Paul H. Leonard
Attorney

United States Patent Office 3,227,213
Patented Jan. 4, 1966

3,227,213
WELL CEMENTING METHOD
Dwight K. Smith, Duncan, Okla., assignor to Halliburton Company, Duncan, Okla., a corporation of Delaware
Filed Apr. 16, 1965, Ser. No. 450,250
11 Claims. (Cl. 166—29)

This application is a continuation-in-part of application Serial No. 229,562, filed October 10, 1962, now abandoned, titled to the benefits of said earlier filed application as to all common subject matter.

The present invention relates to a new and improved method of cementing wells with a clay-cement composition or slurry. It especially relates to a method of cementing pipe in a well bore employing a continuous method of cementing using a pre-hydrated water swelling clay or clay mineral.

The present invention relates to a new and improved method of cementing wells with bentonite cement, and more particularly, to a continuous method of cementing wells employing a pre-hydrated bentonite, montmorillonite, palygorskite or the like.

Bentonite, dry blended with cement, has provided an economical and relatively inexpensive lightweight cement composition for use in cement slurries for well cementing operations. Such filler type cements are widely used in the field, but necessitate employing bulk blending equipment.

In these cement slurries, the bentonite ties up large volumes of the mixing water. It has been determined that each 2 percent of bentonite, dry blended with the cement, requires approximately 1.3 gallons of additional mixing water per sack of cement.

It has been discovered that if the bentonite is initially hydrated with water prior to contacting or mixing it with the cement, a much higher yield is obtained. One percent of bentonite prehydrated with water before mixing with cement is equivalent to 4 to 5 percent dry blended bentonite cement.

It is therefore the primary object of the present invention to provide a new and improved well cementing method using lightweight or gel cement compositions, wherein a water swelling clay mineral such as bentonite, montmorillonite, palygorskite, attapulgite, or other clay minerals, is hydrated with water prior to being mixed with the cement.

Another important object of the present invention is to provide a new and improved method of cementing a well with a pre-hydrated clay cement slurry utilizing a continuous well cementing operation.

It is another object of the present invention to provide a continuous method of cementing an oil or gas well or the like, comprising the steps of:

(1) mixing a predetermined amount of a water swelling clay with a predetermined amount of water in a first mixing apparatus, thereby forming a clay-water slurry;

(2) transferring the clay-water slurry, as formed, in a continuous operation to a second mixing apparatus;

(3) mixing a predetermined amount of hydraulic cement with the clay-water slurry to form a desired gel cement slurry;

(4) introducing the gel cement slurry or clay-cement slurry into the well bore, all in a continuing operation;

(5) pumping the clay-cement-water slurry down a string of pipe in a well bore and up the annular space between the string of pipe and the walls of the well bore; and (6) allowing the slurry to set.

Other objects and advantages of the present invention will become more readily apparent from a consideration of the following description and drawings wherein.

Figure 1:
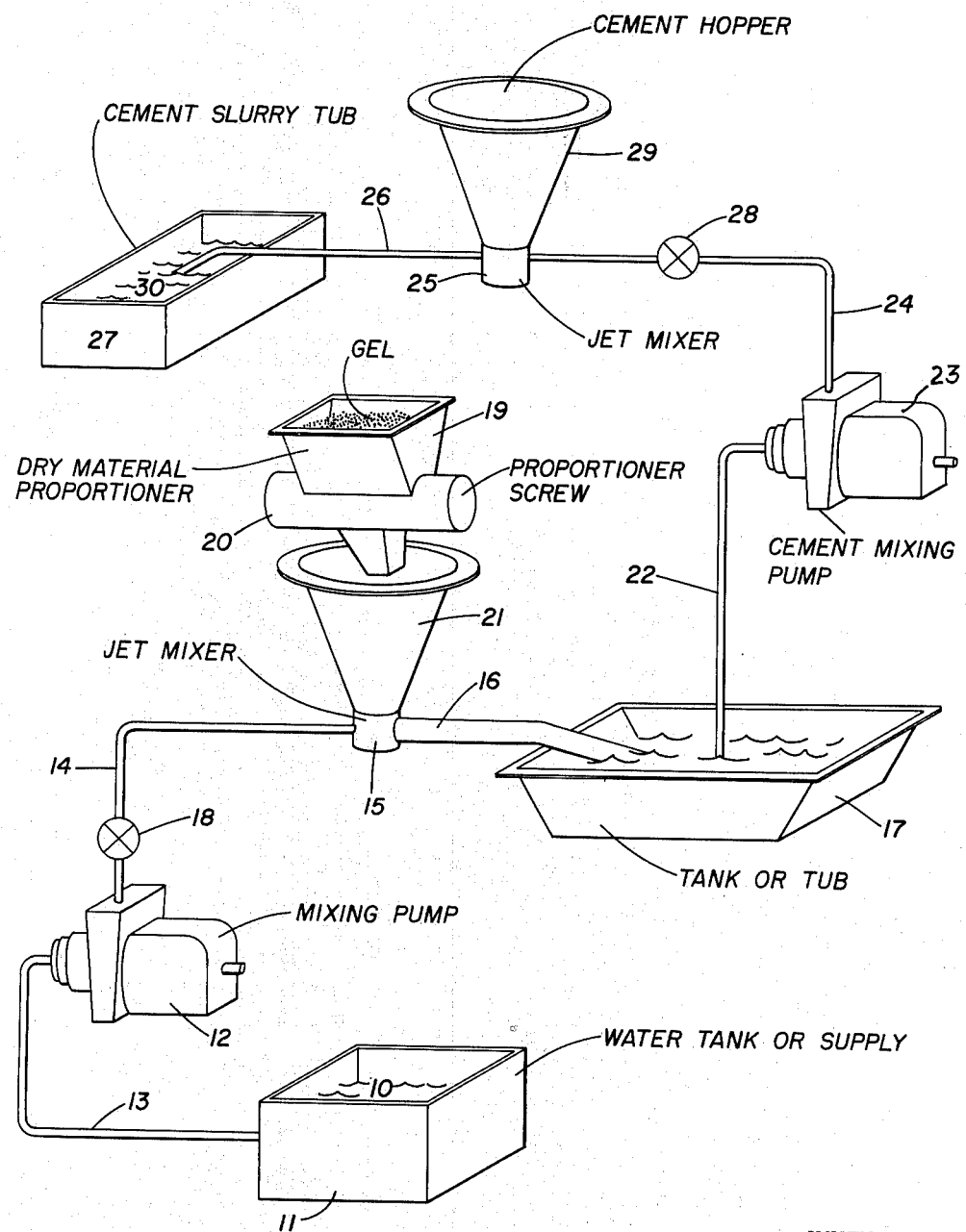
FIG. 1 is a schematic view illustrating one method of carrying out the present invention.

Referring now to the drawings, one method of carrying out the invention is schematically illustrated in FIG. 1.

Water 10 from a water tank 11 or other suitable supply means is pumped by a mixing pump 12 through the line 13, into the line 14, into the jet mixer 15, into the mixer line 16 and into the tank 17, tub or other suitable receptacle. A valve 18 is located at a convenient place the line 14 for regulating the flow of the water 10.

As the water 10 flows through the jet mixer 15, clay, gel, bentonite, montmorillonite, attapulgite or the like is mixed therewith. The dry clay is placed in a dry material proportioner 19 or other suitable device and proportioned into the jet mixer 15 by the proportioner screw 20 or other suitable device at a predetermined rate, thereby forming clay-water slurry of a desired ratio, consistency, and weight. The jet mixer 15 is preferably equipped with a funnel 21 for facilitation in transferring the dry clay or gel from the proportioner 19 to the mixer 15.

The operation is a continuous one, with the clay-water slurry being pumped from the jet mixer 15, into the line 16 and into the tub 17.

A suction line or pipe 22 is located in the tub 17 and connected to a cement mixing pump 23, which pumps or removes the clay-water slurry from the tank 17, through the line 22, into a line 24, into a second jet mixer 25, into a line or pipe 26, and into a tub or tank 27.

A valve 28 is located in the line 24 for regulating the flow of the clay-water slurry.

As the clay-water slurry is pumped through the jet mixer 25, dry cement of a desired type from any suitable source is directed into the jet mixer 25. A cement hopper or funnel 29 is preferably adjacent the mixer 25 for ease in transferring the dry cement into the mixer 25.

Still in a continuous operation, the cement-clay-water slurry is transferred into and through the line 26 and into a suitable receptacle 27.

The cement slurry 30, which is of a predetermined type or ratio of components, may then be pumped or introduced into a well or the line for cementing in a manner well-known in the art.

In cementing a well using the novel method of this invention, a string of pipe is first placed in the bore hole. Then the gel-cement slurry, containing any conventional additives, is pumped down the pipe and out the end of the pipe, or through perforations in the pipe. The slurry is then forced up the annular space between the string of pipe and the walls of the drilled bore hole. The cement is then allowed to set.

Basically, oil well cementing is a process of mixing a cement-water slurry and pumping it down through steel casing to critical points located in the annulus around the casing, in an open hole or in a permeable formation.

Water swelling clays particularly suited for use in the present invention include the montmorillonite group of which bentonite is the principal one presently used in the oil and gas producing industry. Other suitable montmorillonite clays are amargosite, beidellite, chloropal, erinite, ferromontmorillonite, hectorite, magnesium beidellite, metabentonite, montmorillonite, nontronite, otaylite, saponite, and smecite. Some of the more common types of suitable clays are Wyoming bentonite, Texas bentonite, sub-bentonite, California low-yield clay, and high yield bentonite.

Other water swelling clays suitable for use in the present invention and particularly in brine or salt water are the palygorskite group of clays. The principal clay in this group is attapulgite. Other suitable palygorskite clays are calciopalygorskite, Floridin-Floridine, Gumbrine, lasallite, meerschaum, palygorskite, alpha-palygorskite, beta-palygorskite, paramontmorillonite, parasepiolite and sepiolite.

Any water swelling clay, swelling in either fresh or salt water, may be used without departing from the scope of the present invention.

The hydraulic cement mixes with which this invention may be employed to advantage include those in which any hydraulic cement of the character of Portland cement is the principal cementitious composition, the amounts of the essential ingredients of the invention being governed by the amount of this type of cement present in the mix. Any of the common aggregates and fillers may be employed in various proportions to meet different structural requirements. These include stone, gravel, slag, sand, pozzolanic materials, fly-ash, and the like, and such specialized materials as metallic aggregates, aluminum powder, etc. The invention is also applicable to neat cement mixes containing no aggregate or filler. All such mixes are comprehended hereinafter by the term "hydraulic cement mix."

As indicated above, the invention does not preclude the use of other additives, as well as aggregates and fillers, for modifying various characteristics of the mixes for special purposes. For example, air entraining agents, cement dispersing agents, pigments, water-repellent compounds, low fluid loss additives, tracing materials, friction reducers, accelerators, retarders, heavyweight and lightweight additives, etc., may also be used.

The results of laboratory tests on the premixing or prehydration of bentonite and water for determining the amounts of bentonite required to produce slurries similar to blended gel cement are set forth hereinbelow.

Figure 2:
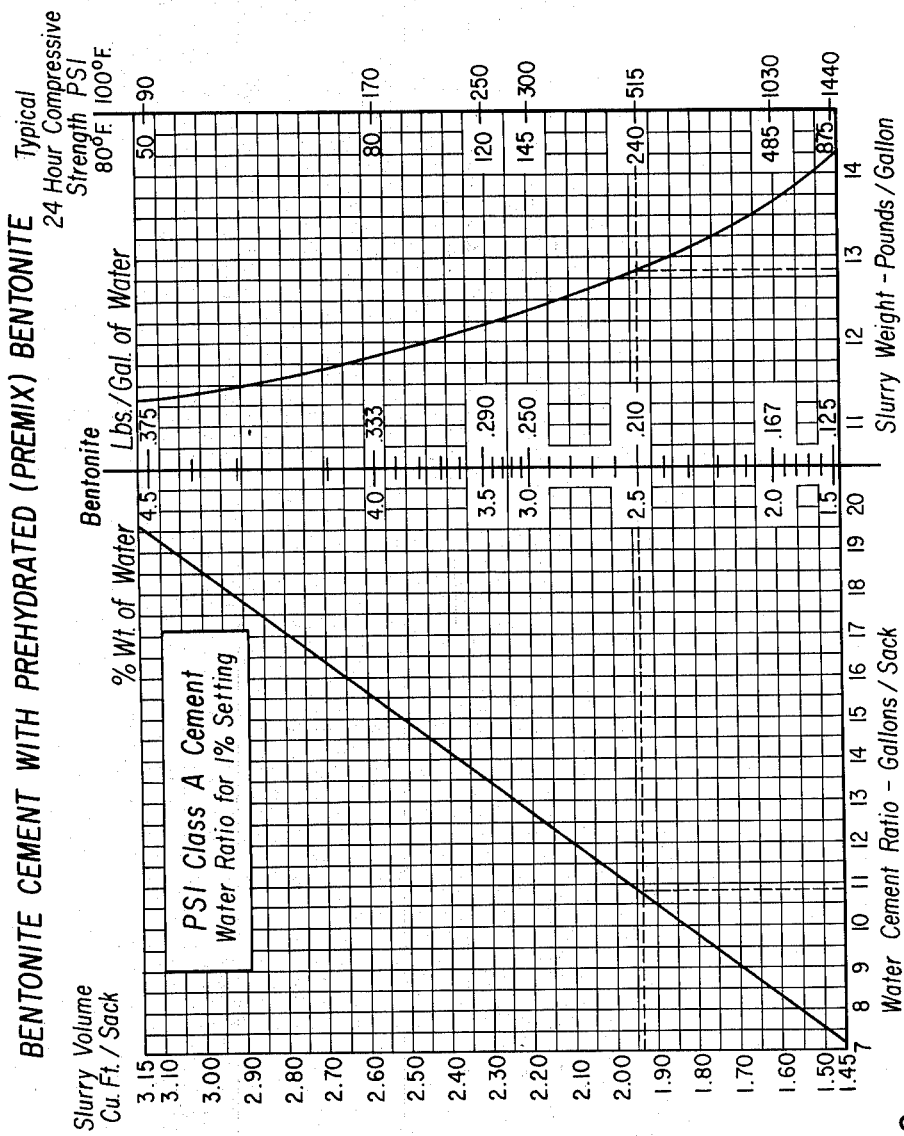
FIG. 2 is a graph illustrating the slurry properties of bentonite cement with prehydrated bentonite; and, FIG. 3 is a graph illustrating the compressive strength of various water cement ratios of prehydrated bentonite-cement slurries at different temperatures.
Figure 3:
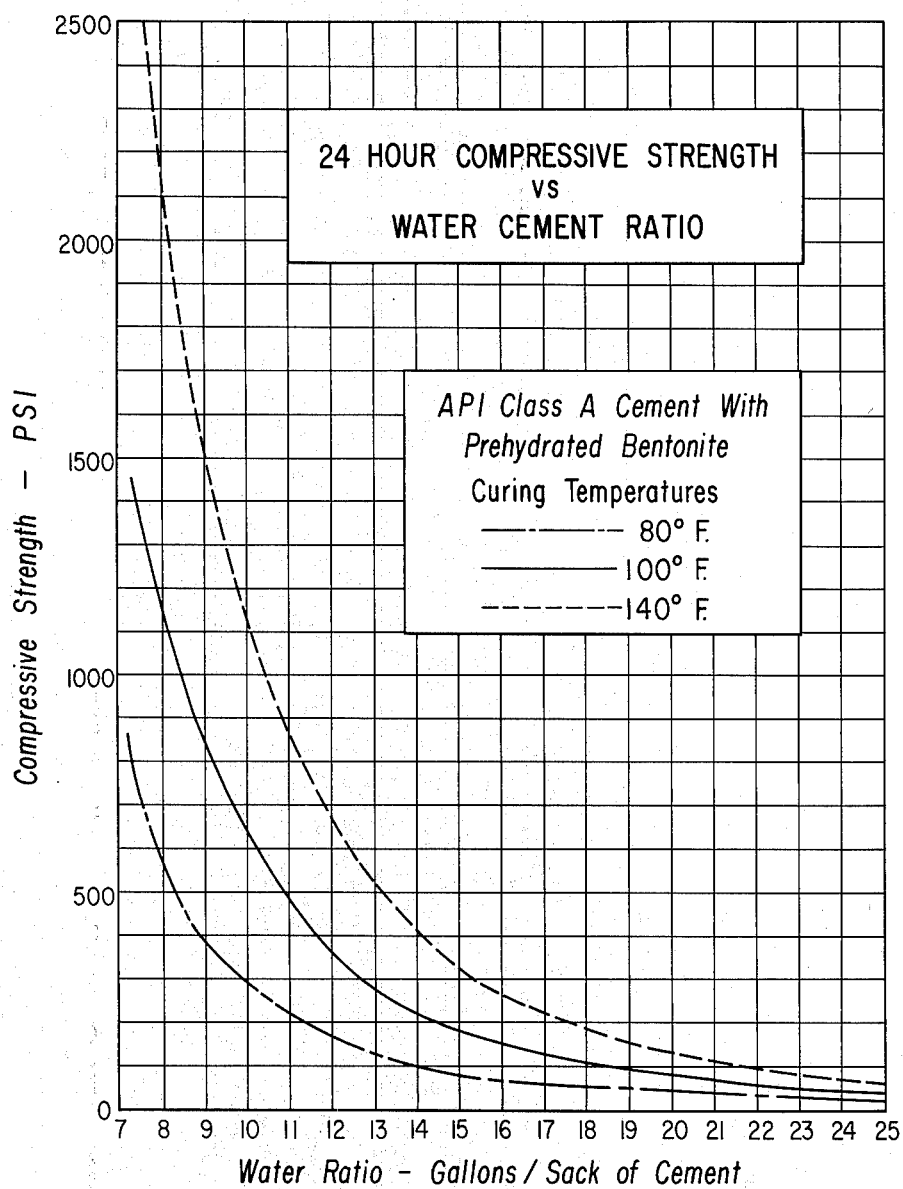

The basic data with respect to slurry properties are shown in both tabular form and in FIGS. 2 and 3 of the drawings. Since there is no fixed ratio between percent bentonite blended with cement and percent bentonite prehydrated, the approximate figure has not been calculated. Data are shown for prehydration of 1.5 percent through 4.5 percent bentonite by weight of the water, with the subsequent slurry weight, slurry volume and water ratio for slurries after API Class A Cement has been added to the bentonite water suspension. These data show that with 4.5 percent premixed bentonite, a cement slurry can be prepared with at least 25 gallons of water per sack and maintain 1 percent or less settling.

It was also found that hydration time of the bentonite was not an important factor. Tests in which bentonite was mixed on the Waring Blendor for only 20 seconds, to simulate mixing through a jet mixer, prior to adding cement, yielded practically the same slurry properties (slurry volume, settling and viscosity) that were obtained when bentonite and water were mixed on the Blendor and retained for two hours before adding the cement. It was also noted that when the bentonite-water slurry was retained for 24 hours before mixing with cement, there was actually an increase in settling. These results indicate that there is no need to store the bentonite-water for a long period of hydration, and in fact it may be preferable to almost immediately mix this slurry with cement to obtain optimum yield.

A limited number of fluid loss tests on filter paper at 100 p.s.i. differential pressure were also made to compare prehydrated slurries with the high gel modified cement. These data indicate that effective fluid loss control is obtained with the low percentage of bentonite prehydrated as compared to the high percentages of bentonite dry blended in the cement.

SCOPE AND PROCEDURE

Initial tests were made using 1½, 2 and 2½ percent bentonite by weight of water, and water cement ratios of 6, 9 and 12 gallons per sack. Slurry viscosity and settling were measured on samples prepared by three methods:

(1) Bentonite and water mixed 20 seconds on Waring Blendor and cement added immediately thereafter;

(2) Bentonite and water mixed 20 seconds on Waring Blendor and hydrated 2 hours before adding cement; and (3) Bentonite and water mixed 20 seconds and stored for 24 hours before adding cement.

Subsequent tests were made following mixing sequence number (1) using 3, 3.5 and 4 percent bentonite with water cement ratios of 15, 18 and 21 gallons per sack. Also, 4.5 percent bentonite was tested for viscosity and percent settling at 18, 21 and 25 gallons of water per sack of cement.

These data were then analyzed to determine the proper water cement ratio with each percentage of bentonite to prepare slurries having 1 percent settling. These water ratios were used to calculate the slurry weight and slurry volume shown in FIG. 2 and compressive strengths were measured at each .5 percent bentonite after curing specimens for 24 hours at 80° F., 100° F., and 140° F. It was found that with the low quantities of bentonite required, there was very good correlation of compressive strength and water ratios. (See FIG. 3.)

The results of laboratory tests on the premixing or prehydration of bentonite and water for determining the amounts of bentonite required to produce slurries similar to blended gel cement are set forth hereinbelow.

RESULTS

In areas where bulk cement is not available, the various tables or graphs can be used to design prehydrated bentonite cement slurries based on any of several properties. If a specific slurry weight is desired, the percent bentonite, water-cement ratio and slurry volume, as well as the approximate compressive strength may be selected in the manner shown by the example (dashed lines) in FIG. 2.

By adopting essentially the same procedure, slurry volume or any other property shown on the graph can be used as the major criteria for selecting a slurry. While thickening time data were not obtained for these slurries, this property should be similar to, or slightly longer than that for dry blended bentonite or gel cement of the same slurry weight.

*Slurry properties for 1 percent settling*

| Bentonite [1] | | Water Cement Ratio, Gal./Sk. | Slurry Weight, Lbs./Gallon | Slurry Volume, Cu. Ft./Sk. |
| --- | --- | --- | --- | --- |
| Percent | Lbs./Gal. | | | |
| 1.5 | 0.125 | 7.3 | 14.2 | 1.46 |
| 2.0 | 0.167 | 8.4 | 13.7 | 1.61 |
| 2.5 | 0.208 | 10.8 | 12.8 | 1.94 |
| 3.0 | 0.250 | 12.7 | 12.3 | 2.20 |
| 3.5 | 0.292 | 13.5 | 12.1 | 2.31 |
| 4.0 | 0.333 | 15.5 | 11.8 | 2.58 |
| 4.5 | 0.375 | 19.5 | 11.2 | 3.13 |
| 4.5 | 0.375 | 25.0 | 10.7 | 3.88 |

[1] Percent by weight of water and pounds per gallon of water. See FIG. 2.

*Compressive strength—p.s.i.*

24 HOURS

| Percent Bentonite By Wt. of Water | Water Cement Ratio, Gal./Sk. | Curing Temperature, °F. | | |
|---|---|---|---|---|
| | | 80 | 100 | 140 |
| 1.5 | 7.3 | 875 | 1,440 | 2,710 |
| 2.0 | 8.4 | 485 | 1,030 | 1,870 |
| 2.5 | 10.8 | 240 | 515 | 905 |
| 3.0 | 12.7 | 145 | 300 | 585 |
| 3.5 | 13.5 | 120 | 250 | 465 |
| 4.0 | 15.5 | 80 | 170 | 300 |
| 4.5 | 19.5 | 50 | 90 | 150 |
| 4.5 | 25.0 | 20 | 35 | 60 |

3 DAYS

| 1.5 | 7.3 | 2,215 | 2,940 | 3,340 |
|---|---|---|---|---|
| 2.0 | 8.4 | 1,435 | 2,160 | 2,395 |
| 2.5 | 10.8 | 770 | 940 | 1,170 |
| 3.0 | 12.7 | 495 | 645 | 820 |
| 3.5 | 13.5 | 415 | 565 | 695 |
| 4.0 | 15.5 | 320 | 365 | 470 |
| 4.5 | 19.5 | 150 | 175 | 230 |
| 4.5 | 25.0 | 70 | 75 | 110 |

*Fluid loss tests*

DRY BLENDED BENTONITE CEMENT
[100 p.s.i. Pressure—Filter Paper]

| Percent Bentonite | Percent Calcium Lignosulfonate | Water Cement Ratio, Gal./Sk. | Fluid Loss, cc./30 Minutes | |
|---|---|---|---|---|
| | | | Mixed 35 Seconds [1] | Mixed 3 Minutes [1] |
| 12 | 0 | 12.3 | 388 | 215 |
| 12 | 0.6 | 12.3 | 200 | 138 |
| 25 | 0 | 16.0 | 190 | 158 |
| 25 | 1.2 | 16.0 | 155 | 93 |

PREHYDRATED BENTONITE CEMENT

| 3.0 | 0 | 12.7 | 460 | 389 |
|---|---|---|---|---|
| 3.0 | 0.6 | 12.7 | 349 | 207 |
| 4.0 | 0 | 15.5 | 341 | 353 |
| 4.0 | 1.2 | 15.5 | 207 | 160 |

[1] Slurries were mixed both for 35 seconds on the Waring Blendor to simulate field mixing by jet mixer, and for 3 minutes on the Waring Blendor to simulate field mixing by a field mixing unit.

The following laboratory tests show that prehydrated bentonite may be used in obtaining slurries of 10.5 to 17.0 pounds per gallon:

SCOPE AND PROCEDURE

API Class E Cement was mixed at 17.0 pounds per gallon using 1.0 percent prehydrated gel with 1.0 percent dispersant dry blended in the cement. API Class A Cement blended with 1.0 percent dispersant was mixed in 5, 6 and 7 percent prehydrated bentonite, using 25 gallons of water per sack.

The initial and 20 minute viscosities were measured on the Halliburton Consistometer, and a 2-hour settling test was made on the 6 and 7 percent prehydrated gel slurries.

DATA

Trinity Inferno cement (oil-well retarded cement)—
17.0 lbs./gal.;
3.8 gals. of water/sack—1% dispersant.
  1.0 percent prehydrated bentonite: [1]
    Initial viscosity—1 poise.
    20 minutes—11 poises.
Ideal Portland cement—1.0% dispersant; 25.0 gals. of water per sack.

| | Percent Prehydrated Bentonite [1] | | |
|---|---|---|---|
| | 5.0 | 6.0 | 7.0 |
| Initial Viscosity, Poises | 2 | 4 (15) | 5 |
| 20 Minutes Viscosity, Poises | 5 | 7 (20) | 14 |
| Percent Settling | | 0.2 | 0 |

[1] Bentonite by weight of mixing water.
( ) Dispersant not used in this slurry.

Some additional laboratory tests were correlated with field mixing trials, and these are shown hereinbelow.

These data indicate that two and one-half (2½) percent bentonite by weight of water will provide a satisfactory slurry with very little tendency for water separation or settling of solids, and a water ratio of 10.8 gallons per sack of cement will allow a sufficient strength specification. Exploratory tests with field pumping equipment also showed that a suitable slurry can be obtained by mixing bentonite and water through one jet mixer, then taking this fluid directly from the mixing tub through a second jet mixer to intermix neat cement and produce a slurry with the above ratio of materials.

Adequate proportioning of materials was obtained by correlation of the sacks of bentonite used and the quantity of water pumped through a flow meter on the discharge line into the first mixer, while cement control was based on a final slurry weight with a Halliburton Densometer measurement in the tub of the second mixer. Bentonite and water mixed in a ratio of one sack (100 pounds) for each 480 gallons of water and cement added in the second mixer yielded a slurry weighing 12.8 pounds per gallon.

The ratios of ingredients in the cement slurries disclosed hereinabove and in FIG. 2 are adapted to give slurry properties particularly desirable in most well cementing operations. It can be appreciated, however, that some variations may be made in the ratio of the slurry ingredients without materially affecting the suitability of the cement slurry for well cementing operations.

SCOPE AND PROCEDURE

Slurries for laboratory tests were prepared by first mixing the specified amount of bentonite with the water for 20 seconds on a Waring Blendor, then adding the cement and continuing mixing for an additional 35 seconds. Different percentages of bentonite and various water-cement ratios were tested for percent settling, and those slurries without excessive free water were selected for determination of pumping time at 80° F. on the Halliburton Consistometer and compressive strength at 60° F. with three days curing time. After trial mixing with field equipment, and selection of preferred proportion of materials, further tests were made on this slurry for pumping time and compressive strength at 60° F. after curing for 3, 9 and 21 days.

Field mixing trials were carried out using the following equipment:

(1) AC pump to handle water for mixing with bentonite.
(2) Halliburton Flow Analyzer to measure quantity of water pumped.
(3) Halliburton Jet Mixer without a bypass and with the 6-inch openings swaged to 1-inch rubber hose to pick-up bentonite. Proportioning of bentonite was controlled by observing the flow analyzer and using 1 sack (100 pounds) of gel with each 480 gallons of water.
(4) VP pump to pick up bentonite-water slurry and discharge it into a second jet mixer.
(5) Halliburton Densometer to measure slurry weight in the tube of the second mixer.
(6) Jet mixer for addition of common cement.
(7) Halliburton T-10 pump to pick up and displace the cement slurry. Samples of the cement slurry were obtained from the second tub for laboratory testing. Mixing pressures were only 260 p.s.i. on the first mixer and 150 p.s.i. on the second mixer and the mixing rate was approximately 12 sacks of cement per minute or 4.5 barrels per minute at the recommended slurry weight.

LABORATORY TESTS

| Percent Bentonite By Wt. of Water | Water Cement Ratio, Gal./Sk. | Slurry Viscosity (Poises) | | Slurry Weight, Lbs./Gal. | Slurry Volume, Cu. Ft./Sk. |
|---|---|---|---|---|---|
| | | Initial | 20 Min. | | |
| 1.0 | 8.5 | 3 | 9 | 13.6 | 1.62 |
| | 12.0 | 1 | 4 | 12.5 | 2.09 |
| 1.5 | 8.5 | 5 | 11 | 13.6 | 1.62 |
| | 12.0 | 3 | 8 | 12.5 | 2.09 |
| 2.0 | 8.5 | 8 | 18 | 13.6 | 1.63 |
| | 12.0 | 5 | 8 | 12.5 | 2.10 |

All slurries except 2 percent bentonite had excessive free water.

*Compressive strength, p.s.i.*
*Curing temperature, 60° F.*

| Percent Bentonite By Wt. of Water | Water Cement Ratio, Gal./Sack | Percent Retarder | Curing Time, Days | | |
|---|---|---|---|---|---|
| | | | 3 | 9 | 21 |
| 1.0 | 8.5 | 0 | 970 | | |
| | 12.0 | 0 | 295 | | |
| 1.5 | 8.5 | 0 | 1,030 | | |
| | 12.0 | 0 | 365 | | |
| 2.0 | 8.5 | 0 | 1,105 | | |
| | 12.0 | 0 | 350 | 850 | 1,070 |
| | 12.0 | [1] 0.4 | 455 | 1,135 | 1,560 |
| | 12.0 | [2] 0.3 | 185 | 555 | 905 |

[1] Calcium lignosulfonate.
[2] Carboxymethylhydroxyethylcellulose.

*Thickening Time—hours:minutes*

HALLIBURTON CONSISTOMETER AT 80° F. 2% BENTONITE BY WEIGHT OF WATER

| Water Cement Ratio, Gal./Sack | Percent Dispersant [1] | Slurry Viscosity (Poises) | | Time to 70 Poises | Strength after Pumping,[2] p.s.i. |
|---|---|---|---|---|---|
| | | Initial | 20 Min. | | |
| 10.0 | 0 | 8 | 16 | 6:38 | 480 |
| | 0.25 | 1 | 4 | 7:08 | 615 |
| | 0.30 | 1 | 8 | 6:27 | 765 |
| | 0.40 | 1 | 7 | 7:10 | 700 |
| | 0.50 | 1 | 2 | 10:00 | 770 |
| | 0.70 | 1 | 1 | 10:00+ | 690 |
| 12.0 | 0 | 5 | 8 | 8:32 | |
| | 0.40 | 1 | 1 | 11:06 | |

[1] Calcium lignosulfonate.
[2] Cured 3 days at 60° F.

*General job considerations*

EACH STAGE

| | Sacks | Gallons | Barrels |
|---|---|---|---|
| Volume of Water | | 100,000 | 2,381 |
| Cement (12 Gal. Water/Sack) | 8,350 | 30,000 | 714 |
| Bentonite (1 Sk./600 Gal. Water) | 167 | 755 | 18 |
| Total Volume | | 130,755 | 3,113 |

Mixing and displacing the slurry within 8 hours required the following rates:

Water, 208⅓ g.p.m. _____ 4.96 b.p.m.
Bentonite, 1 sk./2.9 min. _____ 35 pounds/min.
Water+Bentonite _____ 5.0 b.p.m.
Cement _____ 17.4 sacks/min.
Slurry _____ 6.5 b.p.m.

Completion within 6 hours:
Water, 278 g.p.m. _____ 6.61 b.p.m.
Bentonite, 1 sk./2.16 min. _____ 46 pounds/min.
Water+Bentonite _____ 6.66 b.p.m.
Cement _____ 23.2 sacks/min.
Slurry _____ 8.65 b.p.m.

As some clays do not properly hydrate in brine or salt water, it is sometimes desirable to use a salt water clay. Some laboratory data showing the effectiveness of prehydrating Zeogel, a commercial attapulgite clay, are set forth hereinbelow.

*Attapulgite laboratory tests*

A 10 lb. sample of Zeogel and 5 lbs. of Canada Portland cement were evaluated using a brine water with a specific gravity of 1.2.

Zeogel was used in these prehydration studies to produce a slurry equivalent in density to conventional 4% and 8% dry blend bentonite in fresh water.

4% bentonite using 7.65 gals./sacks of blend, 8% bentonite using 10.45 gals./sack fresh water has a slurry density of 12.9 lb./gal. and a slurry volume of 1.88 cubic feet/sack.

Various concentrations of Zeogel were premixed with the brine water. Slurries were then prepared with a slurry weight of 12.9 and 13.9 lb./gal. Due to the limited supply of cement from the field, Portland cement from laboratory storage was used for these tests. Halliburton Consistometer viscosity and free water separation were used to determine the optimum concentration of Zeogel to be used.

For a 12.9 lb./gal. slurry, 12.46 gals./sack of brine water with Zeogel at 2½% by weight of cement (2.11% by wt. of brine) produces optimum slurry properties. For a 13.9 lb./gal. slurry, 8.80 gals./sack of brine with 1.0% prehydrated Zeogel by weight of cement (1.2% by wt. of brine produces optimum slurry properties.

Compressive strength development was observed for 48 hours when these slurries were cured at 75° F.

| Blend | Brine Water, gals./sack | Prehydrated Zeogel | | Zoegel, lb./gal. brine | Slurry, Wt., lb./ gal. | Slurry Vol., cu. ft./sack |
|---|---|---|---|---|---|---|
| | | Percent by Wt. of Cement | Percent by Wt. of brine | | | |
| (a) | 8.80 | 1.0 | 1.20 | 0.100 | 13.9 | 1.75 |
| (b) | 12.46 | 2.5 | 2.11 | 0.176 | 12.9 | 2.29 |

| Blend | Halliburton Viscosity, Poises | | | Separation Free Water, Percent | Compressive Strength p.s.i. (75° F.) | |
|---|---|---|---|---|---|---|
| | Init. | 10 Min. | 20 Mins. | | 24 Hrs. | 48 Hrs. |
| (a) | 9 | 7 | 5 | 0.8 | 155 | 350 |
| (b) | 9 | 4 | 3 | 0.4 | 120 | 195 |

Broadly, the present invention relates to a new and improved method of carrying out a continuous cementing operation using a prehydrated water swelling clay in the cement composition.

The foregoing disclosure and description of the present invention is illustrative and explanatory thereof and various changes in the materials and apparatus may be made within the scope of the appended claims without departing from the spirit of the invention.

What is claimed is:

1. A continuous method of cementing wells, comprising the steps of:
   (a) mixing a predetermined amount of a water swelling clay with a predetermined amount of water in a first mixing apparatus, thereby forming a clay-water slurry;
   (b) transferring the clay-water slurry substantially simultaneously as mixed to a second mixing apparatus;
   (c) mixing a predetermined amount of hydraulic cement with the clay-water slurry substantially simultaneously as the clay-water slurry enters the second mixing apparatus, thereby forming a clay-cement-water slurry;
   (d) pumping the clay-cement-water slurry down a string of pipe in a well bore and up the annular space between the string of pipe and the walls of the well bore; and,
   (e) allowing the slurry to set.

2. The method of claim 1, wherein the water swelling clay is a montmorillonite clay.

3. The method of claim 1, wherein the water swelling clay is a palygorskite clay.

4. The method of claim 1, wherein the water swelling clay is attapulgite.

5. A continuous method of cementing oil and gas wells and the like, comprising the steps of:
   (a) mixing a predetermined amount of bentonite with a predetermined amount of water in a first mixing apparatus, thereby forming a bentonite-water slurry;
   (b) transferring the bentonite-water slurry substantially simultaneously as mixed to a second mixing apparatus;
   (c) mixing a predetermined amount of hydraulic cement with the bentonite-water slurry substantially simultaneously as the bentonite-water slurry enters the second mixing apparatus, thereby forming a bentonite-cement-water slurry;
   (d) pumping the bentonite-cement-water slurry down a string of pipe in a well bore and up the annular space between the string of pipe and the walls of the well bore; and
   (e) allowing the slurry to set.

6. A continuous mixing method for well cementing and the like comprising the steps of:
   (a) mixing from about 1 percent to about 6 percent bentonite by weight of water with water in a first mixing apparatus, thereby forming a bentonite-water slurry of a desired weight;
   (b) transferring the bentonite-water slurry substantially simultaneously as mixed to a second mixing apparatus;
   (c) mixing hydraulic cement in an amount sufficient to produce a slurry weight ranging from about 10 pounds per gallon to about 17 pounds per gallon with the bentonite-water slurry substantially simultaneously as the bentonite-water slurry enters the second mixing apparatus, thereby forming a bentonite-cement-water slurry;
   (d) pumping the slurry thus formed down a string of pipe in a well bore and up the annular space between the string of pipe and the walls of the well bore; and
   (e) allowing the slurry to set.

7. A continuous method of cementing oil and gas wells and the like, comprising the steps of:
   (a) mixing from about one percent up to about three percent bentonite by weight of water in a first mixing apparatus, thereby forming a bentonite-water slurry;
   (b) transferring the bentonite-water slurry substantially simultaneously as mixed to a second mixing apparatus;
   (c) mixing hydraulic cement in an amount sufficient to produce a slurry suitable for well cementing operations, with the bentonite-water slurry substantially simultaneously as the bentonite-water slurry enters the second mixing apparatus, thereby forming a bentonite-cement-water slurry suitable for cementing a well casing;
   (d) pumping the slurry thus formed down a string of pipe in a well bore and up the annular space between the string of pipe and the walls of the well bore; and
   (e) allowing the slurry to set.

8. A continuous method of cementing oil and gas wells and the like, comprising the steps of:
   (a) pumping water from a supply source through a jet mixing apparatus into a container;
   (b) substantially simultaneously therewith, introducing a quantity of bentonite into the jet mixing apparatus from a supply source, thereby forming a bentonite-water slurry in the container of from about one percent to about six percent bentonite by weight of water;
   (c) pumping the bentonite-water slurry substantially simultaneously as formed from the container into a second jet mixing apparatus and into a second container;
   (d) substantially simultaneously therewith, introducing a quantity of hydraulic cement into the second jet mixing apparatus from a supply source, thereby forming a bentonite-cement-water slurry having a slurry weight ranging from about 10 pounds per gallon to about 17 pounds per gallon;
   (e) pumping the slurry substantially simultaneously as formed from the second container down a string of pipe in a well bore and up the annular space between the string of pipe and the walls of the well bore, all in a substantially continuous operation; and
   (f) allowing the slurry to set.

9. A continuous method of cementing wells, comprising the steps of:
   (a) mixing a predetermined amount of a salt water swelling clay with a predetermined amount of salt water in a first mixing apparatus, thereby forming a clay-water slurry; (b) transferring the clay-water slurry substantially simultaneously as mixed to a second mixing apparatus;
   (b) transferring the clay-water slurry substantially simultaneously as mixed to a second mixing apparatus;
   (c) mixing a predetermined amount of hydraulic cement with the clay-water slurry substantially simultaneously as the clay-water slurry enters the second mixing apparatus, thereby forming a clay-cement-water slurry;
   (d) pumping the clay-cement-water slurry down a string of pipe in a well bore and up the annular space between the string of pipe and the walls of the well bore; and,
   (e) allowing the slurry to set.

10. The method of claim 9, wherein the salt water swelling clay is a palygorskite clay.

11. The method of claim 9, wherein the salt water swelling clay is attapulgite.

(References on following page)

References Cited by the Examiner

UNITED STATES PATENTS

| | | | |
|---|---|---|---|
| 1,500,385 | 7/1924 | Halliburton | 166—28 X |
| 2,041,086 | 5/1936 | O'Brien | 166—29 |
| 2,695,669 | 11/1954 | Sidwell | 166—29 |

OTHER REFERENCES

The Oil and Gas Journal, June 23, 1932, pp. 49 and 50, by Neil Williams.

CHARLES E. O'CONNELL, *Primary Examiner.*

T. A. ZALENSKI, *Assistant Examiner.*